US012079246B2

(12) United States Patent
Zhu et al.

(10) Patent No.: US 12,079,246 B2
(45) Date of Patent: Sep. 3, 2024

(54) SYSTEM AND METHODS FOR DYNAMIC LOG INDEXING AND PROCESSING

(71) Applicant: Oracle International Corporation, Redwood Shores, CA (US)

(72) Inventors: Shushuai Zhu, Nashua, NH (US); Bo Zou, Ottawa (CA); Pinaki Shah, Sunnyvale, CA (US); Jerry Paul Russell, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 118 days.

(21) Appl. No.: 17/727,609

(22) Filed: Apr. 22, 2022

(65) Prior Publication Data

US 2023/0033059 A1 Feb. 2, 2023

Related U.S. Application Data

(60) Provisional application No. 63/228,517, filed on Aug. 2, 2021.

(51) Int. Cl.
*G06F 16/00* (2019.01)
*G06F 16/22* (2019.01)
*G06F 16/28* (2019.01)

(52) U.S. Cl.
CPC ............ *G06F 16/285* (2019.01); *G06F 16/22* (2019.01)

(58) Field of Classification Search
CPC .............................. G06F 16/285; G06F 16/22
USPC ......................................................... 707/740
See application file for complete search history.

(56) References Cited

U.S. PATENT DOCUMENTS

2018/0109550 A1* 4/2018 Huang ................ H04L 63/1425
707/707

* cited by examiner

*Primary Examiner* — Alexandria Y Bromell
(74) *Attorney, Agent, or Firm* — Mughal Gaudry & Franklin PC

(57) ABSTRACT

The present disclosure relates to systems and methods that enhance log data processing, storage, and querying by dynamically allocating mapping connections between processing/storage components based on characteristics of incoming data and the processing/storage components. More particularly, incoming data from a data stream may be extracted and utilized according to dynamic component mapping to more efficiently process the data. Additionally, active processing/storage metrics may cause dynamic reallocation of the component mappings to balance resource loads.

20 Claims, 10 Drawing Sheets

SYSTEM AND METHODS FOR DYNAMIC LOG INDEXING AND PROCESSING

CROSS REFERENCE TO RELATED APPLICATIONS

This application claims the priority benefit of U.S. Provisional Application No. 63/228,517, filed on Aug. 2, 2021, titled "SYSTEM AND METHODS FOR DYNAMIC LOG INDEXING AND PROCESSING," the disclosure of which is herein incorporated by reference in its entirety for all purposes.

TECHNICAL FIELD

The present disclosure relates to systems and methods that enhance log data processing, storage, and query resolution. More particularly, the present disclosure relates to systems and methods that intelligently and dynamically assign, associate, and/or allocate log data according to data and resource configurations to efficiently store, handle, and process log data.

BACKGROUND

Data storing and processing often involves high volumes of data. Systems are utilized for data intake, processing, indexing, storage, and querying. Computing resources associated with the systems are finite. The computing resources must be utilized efficiently to maintain a high data processing throughput. However, methods for partitioning system resources to process data streams are often inefficient and inflexible. For example, partitioning a fixed amount of computing power to process each data set of a data stream causes underutilization of resources when a data set is small. When a dataset is large, the resources are bottlenecked.

Proportional partitioning of resources often subjects data streams to biases. For example, allocating computing resources proportionally based on the size of a dataset will cause a system to dedicate inordinate resources to processing a large data stream. The system may provide lesser processing resources to smaller, but equally important data streams.

SUMMARY

In some embodiments, a computer-implemented method is provided for the dynamic and flexible storage, processing, and handling of log data. A stream of log data can be received. The stream of log data can include at least one group of log data, and each particular group of log data of the groups of log data can include one or more log messages sharing a common property associated with the particular group of log data. The one or more groups of log data can be extracted from the stream of log data. One or more log sets of data can be generated using the one or more groups of log data. The one or more log sets of data can be associated with a log index, which is a dedicated partition of computer memory stored on a memory device. The dedicated partition of computer memory can correspond to the common property. The log index can be assigned to a log processing bucket, which can include a set of log indexes. The log index can be included in the set of log indexes, and the log processing bucket can include a data domain for accessing the log sets of data. The log processing bucket can include processing paths for log processor instances to access and process the one or more log sets of data. The log processing bucket can be allocated to a log processor instance that is a grouping of computing resources. The log processor instance can include one or more processing resources for processing log data, and each of the processing resources can perform various operations. The processing resources can access the data domain through the processing paths to retrieve a log set of data stored in the data domain. The processing resources can input the log set of data to a logical data circuit to receive process data as output. The processing resources can store the processed data in the computer memory.

In other embodiments, a non-transitory computer-readable medium includes a computer-program product for the dynamic and flexible storage, processing, and handling of log data. The computer-program product can cause a data processing apparatus to perform various operations. The computer-program product can receive a stream of log data that can include one or more groups of log data. Each particular group of log data of the groups of log data can include log messages sharing a common property associated with the particular group of log data. The computer-program product can extract, from the stream of log data, the groups of log data. The computer-program product can generate, using the groups of log data, one or more log sets of data. The computer-program product can associate the log sets of data with a log index, which is a dedicated partition of computer memory stored on a memory device. The dedicated partition of computer memory can correspond to the common property. The computer-program product can assign the log index to a log processing bucket, which can include a set of log indexes. The log index can be included in the log indexes, and the log processing bucket can include a data domain for accessing the log sets of data. The log processing bucket can include processing paths for log processor instances to access and process the log sets of data. The computer program-product can allocate the log processing bucket to a log processor instance that is a grouping of computing resources. The log processor instance can include processing resources for processing log data, and each of the processing resources can perform various operations. The processing resources can access the data domain through the processing paths to retrieve a log set of data stored in the data domain. The processing resources can input the log set of data to a logical data circuit to receive process data as output. The processing resources can store the processed data in the computer memory.

In yet other embodiments, a system is provided for the dynamic and flexible storage, processing, and handling of log data. The system can include one or more data processors and a non-transitory computer-readable storage medium comprising instructions which, when executed on the one or more data processors, cause the one or more data processors to perform various operations. The system can receive a stream of log data that can include one or more groups of log data. Each particular group of log data of the groups of log data can include log messages sharing a common property associated with the particular group of log data. The system can extract, from the stream of log data, the groups of log data. The system can generate, using the groups of log data, one or more log sets of data. The system can associate the log sets of data with a log index, which is a dedicated partition of computer memory stored on a memory device. The dedicated partition of computer memory can correspond to the common property. The system can assign the log index to a log processing bucket, which can include a set of log indexes. The log index can be included in the log indexes, and the log processing bucket can include a data domain for accessing the log sets of data. The log processing bucket can include processing paths for log processor instances to access and process the log sets of data. The system can allocate the log processing bucket to a log processor instance that is a grouping of computing resources. The log processor instance can include processing resources for processing log data, and each of the processing resources can perform various operations. The processing resources can access the data domain through the processing paths to retrieve a log set of data stored in the data domain. The processing resources can input the log set of data to a logical data circuit to receive process data as output. The processing resources can store the processed data in the computer memory.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
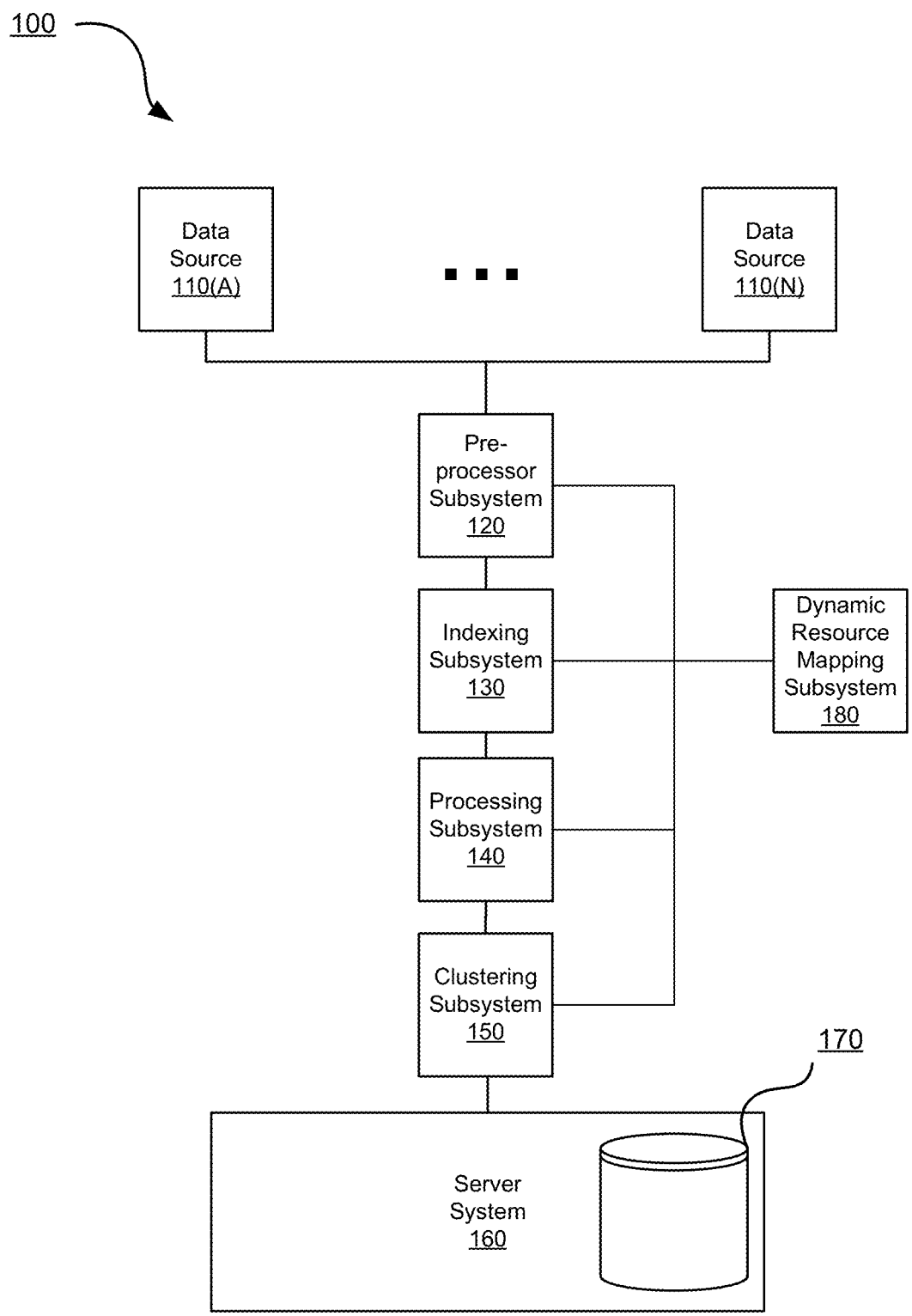
FIG. 1 is a block diagram illustrating an example of a data processing environment according to an embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

Certain aspects and features of the present disclosure relate to systems and methods for dynamic and flexible log data storage and processing.

As used herein, a "log message" refers to a short segment of data and a corresponding key value pair. A log message may be structured or unstructured data.

As used herein, a "stream of log data" or "log data stream" refers to plurality of log data in transit between a first and second system.

As used herein, "groups of log data" refers to groupings of log messages from a data stream. Groups of log data are groups of raw log messages associated with and received from a data tenant as part of a stream of log data.

As used herein, "log sets of data" refers to bundles of raw groups of log messages/data into new sets of log data. The log sets of data are sets of data comprising groups of log data from the tenant in a new configuration and/or format.

As used herein, a "log index", or "log index of data", refers to a set of referential data which is mapped to one or more logs sets of data. The log indices provide additional support for grouping, identifying, and querying for the log sets of data mapped thereto.

As used herein, a "log processing bucket" refers to one or more processing pathways/storage platforms through which a system may send log sets of data for processing. A log processing bucket is a domain in which log data may be stored and/or through which it may be routed as part of a data processing operation.

As used herein, a "log processor instance" refers to an grouped collection of processing resources which process/parse log sets of data to determine characteristics about the log sets of data. A log processor instance is an instance or grouping of instances of processing hardware/components that process data to generate metadata from the processed data or transform the data.

Data tenants often send their data to data services to store and process the tenant's data. When a feed (e.g. a live or pre-recorded video file) is being streamed from a first system to a second system, the streaming can occur continuously and/or constantly. This tenant's data in the stream can often be sorted into groups of log data, which are groupings of one or more log messages. The groupings of log messages may be generated by some application, program or process and may be associated with metadata properties, such as the source of the log messages, the data format of the log messages, etc. "Raw" groups of log data are groups of log messages presented in the same format in which the log messages were received. Storage of groups of log data from the stream may include storing the groups of log data in an electronic storage. Processing may include parsing the groups of log data to determine aspects of the groups of log data and/or transforming the groups of log data. Tenants' groups of log data may be highly complex and correspond to a variety of data contexts. For example, a single super-tenant may receive/host multiple groups of log data of multiple sub-tenants. All of the sub-tenant log data may be sent as part of the stream of log data to a separate storage/processing system by the super-tenant. Processes for partitioning resources to handle the groups of log data is subject to the inefficiencies identified above in these situations.

As described herein, a dynamic system reorganizes the incoming log data from the data stream and maps the reorganized data to log indices. The log indices allow for dynamic and efficient allocation of groups of log data among the data structures of a system. Accordingly, query resolution efficiency can be improved, as groups of log data are dynamically organized into more efficient bundled sets of log data and associated with searchable log indices. The searchable log indices may be further assigned to log data processing resources. The assignment allows log data processing resources to be allocated efficiently based on the configuration of the log data and log indices.

The dynamic system may comprise at least three steps for improving storage, query, and processing capabilities for received log data: (i) re-bundling the raw groups of log data into log sets of data, (ii) associating the newly bundled log sets of data to a log index of one or more log indices, and (iii) allocating the log indices to processing resources for processing the newly bundled log sets of data.

Raw groups of log data log may be collected directly from applications or programs and forwarded by a data tenant in a stream of log data for storage, processing, or a combination thereof by an independent system. Raw groups of log data are often inefficiently grouped by the forwarding or streaming tenant. For example, log data may be grouped according to data owned by each sub-tenant of a super-tenant. Some log data groups may be very small, and other log data groups may be large. Accordingly, "gaps" in a receiving system's storage medium can be present, and more partitions of the storage medium will be required to store the raw groups of log data. As a result, the groups are difficult to parse with a query system and are not efficiently stored or accessed by the receiving system.

Regarding step (i) for improving storage and query capabilities mentioned above, data processing, queries, storage, or a combination thereof is made more efficient by dynamically re-bundling the raw groups of log data into new, efficient sets. Log sets of data are efficient and dynamically determined bundles of raw groups of log data from a tenant. For example, the log sets of data may be bundled groups of log data according to a particular data size to reduce or eliminate "gaps" in a storage medium. Step (i) thus dynamically determines aspects of incoming raw groups of log data and bundles the groups for improved parsing and utilization. For example, if a data processing system efficiently processes data queries using log sets of data having a total data size of 4 Gigabytes (GB), a number of raw groups of log data may be bundled together to form a new, more efficient log set of data. One raw group of log data of size 3 GB and one group of log data of size 1 GB may be bundled to form a 4 GB-sized log set of data. Whereas previously, each of the 3 GB and 1 GB groups may be placed in separate storage partitions, the new 4 GB log set of data may be placed into a single storage partition of 4 GB, halving the required partition resources and eliminating the two resulting "gaps." Efficiency is further improved by associating the new bundles with individual log indices, which allows for efficient organization and querying of data in step (ii).

In step (ii), the bundled log sets of data are associated with a log index of one or more log indexes. For example, resolving queries on an entire set of log sets of data would previously require searching each log set of data separately. Using the associated log indices, the smaller log indices may be searched first, instead of the individual log sets of data. If it is known which log sets of data the log index is associated with (i.e. a particular log index is associated with log sets of data from a subset of particular sub-tenants), then the query may be resolved with more efficient use of search resources (i.e. search the particular log index first if the query comprises information about the particular tenant). Using steps (i) and (ii) described above, the dynamic system improves querying efficiency.

The log indices also provide a layer of abstraction useful to other components of a log data processing system. For example, because each log index is associated with a number of log sets of data having a particular configuration (i.e. as close to 4 GB of total data size as possible), components may reference a log index instead of the number of log sets of data. Components normally referencing log sets of data may instead reference corresponding log indices (i.e. an 8 GB partition of storage memory may be associated with two log indices corresponding to bundled log sets of data of total size 4 GB, instead of the partition being mapped to sixteen separate 0.5 GB-sized log sets of data).

This configuration is also useful for further processing of the log sets of data. In step (iii) mentioned above, the log indices may be used to allocate the log indices to processing resources of a system. The log indices map or allocate directly to the processing resources, causing corresponding log sets of data to be indirectly mapped or allocated to the processing resources. For example, the log indices (and therefore the corresponding log sets of data) may be further mapped or allocated to processing resources, such as log processing buckets and log processor instances.

The allocation of log indices to processing resources further improves processing, as log index groups may be dynamically assigned to processing resources according to the capabilities of the processing system (or the processing requests of a tenant in some embodiments). For example, a particular log processor instance may be capable of processing 16 GB of log data over an hour. The particular log processor may then be allocated four log indices, each of the four log indices themselves associated with log sets of data having a total data size of 4 GB. Thus, the particular log processor instance processes log sets of data efficiently over the course of the hour by neither underutilizing nor bottlenecking the processor. Allocation of log indices to processing resources is performed more quickly than determining sizes of individual log sets of data and allocating the log sets of data individually to a log processor instance. Thus, data processing is improved and "bottlenecks" are prevented when processing the incoming stream of log data from the tenant.

In some embodiments, particular sub-tenants may require relatively fewer processing resources for processing their data taken from the stream of log data, while others may require relatively more. Simple provisioning methods would previously split resources for processing data equally among groups of data, and not according to the most efficient use of the resources to process the data in parallel. Dynamic mapping using log set of data and log indices facilitates assignment of processing resources based on aspects of the log data itself. For example, a particular data index associated with a particular sub-tenant and mapped to the sub-tenants log sets of data, may be assigned to a log processing bucket and/or log processor instance, which parses data at a rate optimal for the sub-tenants needs. If the sub-tenant requires expedited processing, the particular log index map be allocated to high-performance processing resources. The opposite may be true if the sub-tenant only requires storage of their log data and processing is not a priority.

Thus, the process of steps (i) and (ii) improves querying and storage capabilities of a system receiving raw groups of log data by using the dynamic techniques described herein. The process including step (iii) mentioned above further improves processing of the data after steps (i) and (ii) are complete by allocating the associations in (i) and (ii) to processing resources. The steps of (i), (ii) and (iii) are further described below in greater detail and with reference to additional embodiments.

Prior to, or concurrent with receiving incoming log data, such as raw groups of log data, a data ingest system may dynamically determine one or more aspects of the incoming data. For example, the data ingest system may determine characteristics such as the size, type, format, or composition, etc. of incoming log data. The ingest system may also determine contextual information, such as a preferred tenant data bundle size, a number of sub-tenants or sub-streams of the data, previously processed or stored amounts of tenant data, etc. In various embodiments, the data ingest system or a similar system may determine one more log sets of data comprised in the incoming log data. A log set of data may be a grouping of data such as log messages with some certain characteristic. A log set of data may be defined by a group of log messages associated with a common property shared by each log message of the group of log messages. For example, users may be interested in searching for a group of log messages based on the common property shared by each of the log messages (e.g. the source tenant from which the log messages originated). When the log data are being collected and then being ingested to the processing system, the log messages with a certain property can be grouped together and can be processed together in the processing pipeline. The grouped log messages can be stored in the same CoreGroup or other suitable computer memory in data storage. During processing, the common property can be associated with the group of log messages as an attribute, which can include "log set," meaning log messages having the same attribute are in the same log set.

Without the log sets defined from some common properties, users may have to do a global search across all computer memory to find log messages containing a particular keyword. With the log set, users can narrow down the searching directly to the targeted small set of computer memory. Some bundle sizes of data may be processed more efficiently by a system than others. For example, if a processing component can parse a particular size of data in a certain time period, an efficient size of a particular bundle of data may be equivalent or close to the particular size of data which can be parsed in the certain time period. In various embodiments, a system such as data ingestion system may determine whether incoming data is configured in groups of efficient data sizes. In response to detecting the incoming log data is already grouped in an efficient set of data sizes, the data ingest system or a similar system may begin indexing operations on the incoming log data as soon as it is received.

In some implementations, in response to determining that the incoming log data from the stream of log data or a subset of the incoming log data is not grouped in efficient data sizes, the data ingest system or a similar system may extract, deconstruct, repurpose, transform, or otherwise change the configuration of the incoming log data to comprise more efficient size groupings. For example, the data ingest system may extract the incoming log data from existing groupings in order to reorganize the data into efficient bundles of data. The data bundles may preserve properties and/or aspects of the data and have a data size which is more efficiently parsed by processing systems. In various embodiments, generating one or more bundles comprises grouping data into bundles with different log sets in a storage size closest to an preferred or predetermined storage size without altering the composition of the data comprised therein.

Data bundles having an efficient size are more effectively processed by computing resources. Assignment of resources to parse bundles containing multiple log sets of data may be determined in portions of associated log indices. In some implementations, one or more log sets of data may be mapped to or otherwise associated with a log index of a number of log indices. A log index may be a data object or entity representing a subset of processing resources for parsing and/or storing log sets of data. For example, a log index may be allocated to a core group of processing resources associated with a particular rate or metric of processing throughput over a period of time. Any number of log indices may be generated or utilized as needed. For example, a log index may represent the ability to process 1.5 Terabytes (TB) of log sets data over a 24 hour period. Log sets of data may be mapped to or associated with log indices based on a resource need for processing and/or storing the log set of data over a period of time. For example, if 6 TB of log sets of data is desired to be processed over a 24 hour period, four log indices each representing a 1.5 TB throughput over 24 hours may be instantiated and mapped to or otherwise allocated the log sets. Thus, bottlenecks are prevented in processing the stream of log data from a tenant, while the utilized processing resources at a processing system are maximized.

In various embodiments, a system such as the data ingest system can pre-process the incoming data by determining whether the incoming data contains any log sets or may be transformed to create any bundles containing data with log sets that were previously mapped to or associated with one or more log indices. If no mapping or association is found, the data ingest system or a similar system may create a new mapping or association for the incoming log data which may be reused for future operations. For example, a data ingest may recognize 5.48 TB of incoming log data from a single data source that is distributed among 12 differently sized data groups based on some common property, like entity name. The data ingest system may determine that the 5.48 TB of log data may be grouped into 0.5 TB sized log sets without compromising the data. In some embodiments, the data ingest system may then cause grouping of the data into 9 log sets of 0.5 TB of data and 2 additional log sets of 0.49 TB, though other embodiments are possible. The system may associate up to 3 log sets with one of a set of log indices allocated a throughput of 1.5 TB in 24 hours. The association allows the log sets of data to be processed efficiently over a 24 hour period. It will be appreciated that multiple metrics or allocation/grouping methods may be used as part of the dynamic association between log sets and log indices.

The association of efficiently grouped log sets with log indices provides an efficient allocation of processing resources while eliminating bias. The portioning of large sets of data mitigates disproportional allocation of processing resources to a particular set of data. Additionally, as data is received at a system, log indices may be created, deleted, or otherwise utilized to meet processing demands associated with the data. Thus, the processing of data remains flexible, unbiased, efficient, and proportionally scalable to the size of an incoming dataset.

In some implementations, one or more log indices may be assigned to a processing cluster such as a log processing bucket of a number of log processing buckets. One or more log processing buckets may correspond to a temporary cluster storage domain for storing and processing data. For example, a log processing bucket may comprise a temporary memory cache in which one or more log sets of data may be stored while being processed, parsed, or otherwise utilized. Each log index may be assigned to a particular log processing bucket. For example, a particular log processing bucket may comprise a memory cache domain which temporarily stores one or more log sets of data corresponding to the assigned log index. All log sets of data associated with the log index may be sent to the particular log processing bucket, and the domain comprised therein, for storage to facilitate the techniques described herein.

In various embodiments, each log processing bucket is associated with one or more processing pathways through which processing resources may access the domain and process log sets of data stored therein. For example, one or more processing pathways may be networked connections between the log processing bucket and a plurality of processing resources to allow the processing resources to access the domain of the log processing bucket and therefore the log sets of data stored therein. The processing resources may identify, parse, process, copy, extract, transfer, or otherwise utilize the log sets of data accessing in the domain through the processing pathways to cause processing of the log sets of data.

In some implementations, one or more log processing buckets may be allocated to a log processor instance of a number of log processor instances. One or more log processor instances may comprise one or more sets of computing resources which process or cause storing on data from a log set of data. For example, a particular log processor instance may concurrently process data stored within the domains of a plurality of log processing buckets through a plurality of associated processing paths. The one or more log processor instances may be further mapped to one or more data clusters on the server storage system or some other electronic storage medium. The one or more log processors instances may cause storing of data on a particular corresponding server cluster (i.e. a subset of computer memory storage) once the instances finish processing data. For example, a set of log processor instances may store processed data within a repository subset of a server for non-volatile memory storage such as hard drive or solid state storage.

In various embodiments, the log processor instances described herein may include one or more central processing units or other memory-based processing hardware for processing a set of data, including log data, according to programming rules or paths. For example, the log processor instances may be groups of processing hardware chips designed to receive log data and process the log data to cause a result. The groups of processing hardware chips may be operable at the level of individual processing hardware chips as separate processing resources. Each of the processing hardware chips as processing resources may be further operable at the level of individual cores of each processing hardware chip such that the individual cores are capable of parallel data processing within the individual processing hardware chip. The processing hardware chips may be configured to receive or access, as input, data such as log sets of data. The input log sets of data may be parsed according to logical data circuits within the cores of the processing hardware chips to cause generation of an output. The output may be process data comprising a transformed version of the original input log set of data or some other output according to the logical circuits data circuits within the processing hardware chip. For example, the output process data may be determined or generated metadata from the log data, a transformed second set of data based on the log data, compiled log data, extracted sub-data from the log data, transformed log data, or any other result conceivable as output when using an input of log data to the processor instance. The output process data may be stored in a computer memory subsequent to being generated by the logical data circuit of the processing hardware chip. A log processor instance accesses, using one or more allocated log processing buckets, log sets of data in a memory domain of the log processing buckets using one or more processing pathways associated with the log processing buckets.

In some implementations, one or more groups of incoming log data are received from a single data tenant. A single data tenant may be a single entity that sends data to a process system such as those described herein. A single data tenant may host, compile and/or dispatch multiple independent channels of incoming data to a data processing system. For example, a single data tenant may host the data of one or more sub-tenants. Individual sub-tenant data may be sent to a data processing system in any format, including in a log set of data. In various embodiments, a single data tenant may send block data to a data processing system including one or more log sets of data corresponding to data channels for one or more sub-tenants.

In some implementations, dynamic reallocation or remapping between entities of a system may occur as data processing proceeds. For example, a dynamic entity such as a data ingest system or dynamic resource mapping or allocation subsystem may monitor processing and storage performances by entities to determine a relative resource utilization. The determinations may be used to alter the manner in which one or more objects function. For example, a dynamic monitoring system may determine, in real-time, that one or more components are being under-utilized or over utilized and alter allocations or mappings accordingly. Under-utilized entities may be reallocated remapped according to other entities which are over-utilized or vice versa. For example, a particular first log processor instance may be under-utilized in processing log set data. A particular second log processor instance may be operating at maximum capacity while processing data in a particular corresponding log processing bucket. A dynamic resource allocation unit may cause real-time remapping of the particular first log processor instance to the particular log processing bucket to increase processing efficiency.

Exemplary Environment for Dynamic Lot Indexing and Processing

FIG. 1 is a block diagram illustrating an example of a data processing environment. Processing environment 100 may be used to cause dynamically mapped data processing according to the embodiments described herein. Processing environment 100 may comprise one or more data sources 110 such as data sources 110(A) through 110(N). In various embodiments, data sources 110 are sources or systems from which log data may be received. For example, incoming log data that will be processed by processing environment 100 may be received from data sources 110 as part of a stream of log data.

Processing environment 100 may further comprise pre-processor subsystem 120. Pre-processor subsystem 120 may be a system or entity such as a data ingest system that causes pre-processing of mapping relationships or data prior to or concurrent with the reception of log data from data sources 110(A)-110(N). For example, in response to receiving metadata from a data source 110, pre-processor subsystem 120 may determine one or more characteristics of incoming data such as the properties, size, format, configuration, etc. of the incoming data. In various embodiments, pre-processor subsystem 120 may comprise an extraction module for exacting log data or groups of log data from a stream of log data. For example, pre-processor subsystem 120 may parse the incoming stream of log data to determine and/or extract one or more groups of log data. The one or more groups of log data may be identified, extracted, and grouped according to a common property of the log data, such as ownership metadata associated with a sub-tenant entity. The common property can be a property of log data that is the same or similar among the one or more groups of log data. The common property can include an origination location or origination entity of the log data, a data type of the log data, a time of acquisition of the log data, other suitable common properties, or any suitable combination thereof.

Processing environment 100 may further comprise indexing subsystem 130. Indexing subsystem 130 may be a system for mapping or associating log sets of data with log indices according to the embodiments described herein. For example, in response to receiving pre-processed data from pre-processor subsystem 120, indexing subsystem 130 may instantiate one or more log indices for associating with one or more log sets of data. The instantiated log indices may be mapped to or associated with log sets of data prior to processing of the log sets of data (e.g., statically or initially) and/or dynamically as processing occurs.

Processing environment 100 may further comprise processing subsystem 140. Processing subsystem 140 may be a system for processing one or more log sets of data that are received from a data source 110 according to the embodiments described herein. For example, processing subsystem 140 may receive data from indexing subsystem 130 corresponding to an association or mapping between one or more instantiated log indices and corresponding log sets of data. Processing subsystem 140 may then process the data using entities comprised therein, such as log processing buckets and/or log processor instances.

Processing environment 100 may further comprise clustering subsystem 150. Clustering subsystem 150 may be a system for determining mappings between or allocations associated with processing entities such as those comprising processing subsystem 140 and clusters of a server entity. For example, clustering subsystem 150 may allocate one or more log processor instances to one or more server cluster memories or data storage. Processing environment 100 may further comprise server system 160. Server system 160 may be a server system for receiving and storing data in a storage medium. Server system 160 may comprise storage 170 which may be partitioned and may be an electronic storage medium for storing data such as log set data.

Processing environment 100 may further comprise dynamic resource mapping subsystem 180. Dynamic resource mapping subsystem 180 may be a system connected to other components of processing environment 100 for facilitating dynamic real-time changes to mappings, associations, assignments, allocations, and/or procedures therein. Dynamic resource mapping subsystem 180 may comprise one or more monitoring subsystems or entities which actively manage, in real-time, one or more components of processing environment 100. For example, dynamic resource mapping subsystem 180 may access log processor instances in processing subsystem 140 to determine utilization resource loads on a particular log processor instance. Dynamic resource mapping subsystem 180 may remap or reallocate the particular log processor instance to another entity based on the measure performance metric thereof. Additionally, dynamic resource mapping subsystem 180 may reassign, reallocate, update storage, and perform other suitable tasks with respect to log indexes, log processing buckets, log processing instances, and the like in processing environment 100.

Exemplary Process for Dynamic Lot Indexing and Processing

Figure 2:
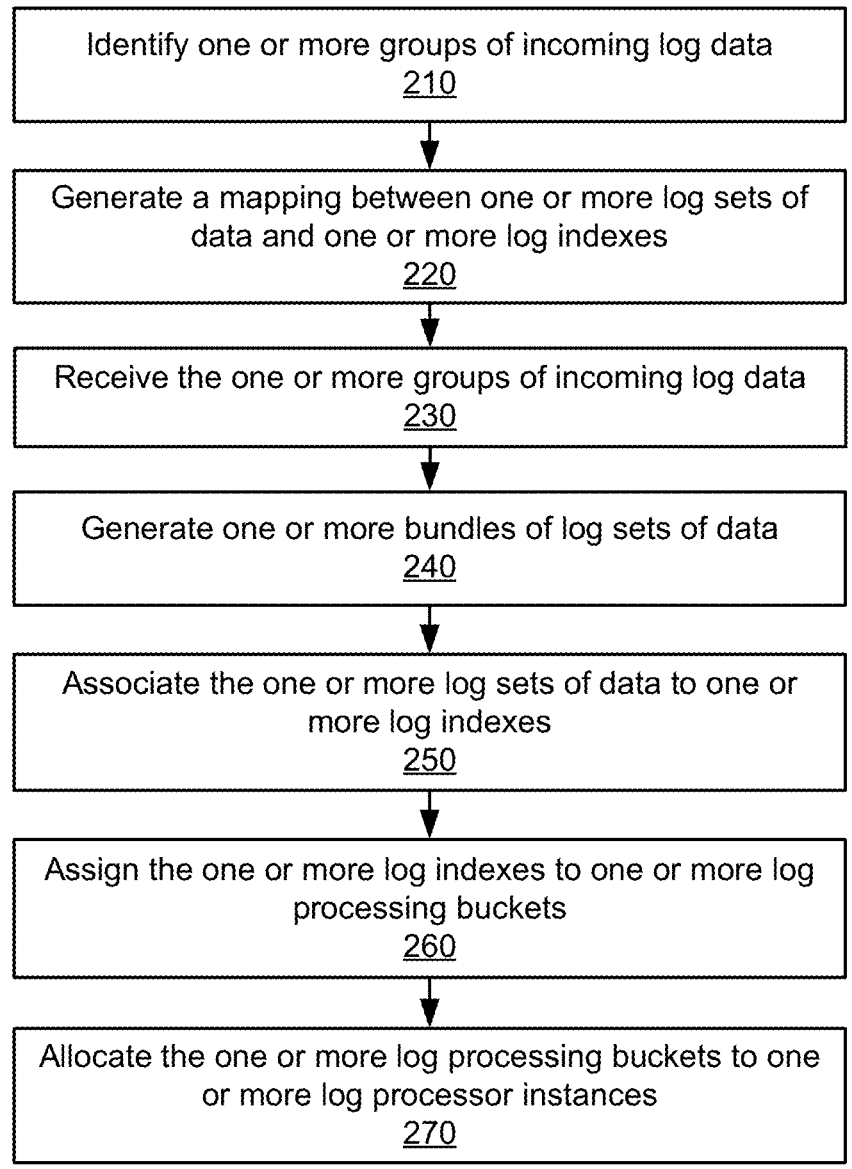
FIG. 2 is a flow chart of a process for dynamically allocating data processing resources according to an embodiment.

FIG. 2 is a flowchart illustrating an example of a process 200 for dynamically allocating data processing resources. Process 200 may be performed at least in part by any of the components described in the figures herein, for example, by any component of processing environment 100 or by processing environment 100, itself. Process 200 begins at block 210, when one or more groups of incoming log data are identified. The identified log data may originate from one or more different data tenants or entities and may be identified by a pre-processing entity such as pre-processor subsystem 120. In various embodiments, block 210 or a subsequent block may cause the identified log data to be extracted from an incoming data stream. For example, a stream of log data may be parsed to determine the one or more groups of incoming log data, and the one or more groups of log data may be extracted from the stream and stored in a temporary computer memory. In some embodiments, data tenants or entities from which the incoming log data originates may communicate with the processing environment 100 (or any component thereof) for identifying the incoming log data. For example, the data tenants or entities may inform the data processing environment 100 that log data is incoming, that the log data includes one or more common properties, the size of the log data, etc.

At step 220, an association between one or more log sets of data and one or more log indices is generated. For example, a pre-processing entity such as pre-processor subsystem 120 may determine one or more log sets of data from the one or more groups of incoming log data and generate an association or a mapping between the log sets of data and one or more log indices to be generated. Each log index of the one or more log indices may be stored on or otherwise associated with a partition of computer memory. For example, a log index may represent a partition of computer memory of the server system 160 or other suitable computer memory. The association can link the log data to the partitioned memory of the log index. In some embodiments, the log data can be stored (e.g., prior to, subsequent to, etc.) in the partitioned memory of the log index.

At step 230, the one or more groups of incoming log data are received. The data tenants or entities from which the log data originates transmits the one or more groups of incoming log data to the processing environment 100, and the processing environment 100 receives the log data. In some embodiments, the log data may be pre-processed. For example, the log data may be parsed or otherwise efficiently grouped (e.g., and ready to associated with a log index) prior to being received by the processing environment 100. In other embodiments, the processing environment 100 may proceed to step 240 to generate bundles of log sets of data.

At step 240, the received one or more groups of incoming log data are used to generate one or more bundles of log sets of data. For example, one or more log sets of data may be re-organized and one or more data bundles of log sets of data may be generated as a result of the re-organization. In various embodiments, the one or more groups of received log data may be transformed to generate the one or more bundles of log sets of data. Each bundle contains log sets to be mapped to a single log index in further steps of the process.

At step 250, the one or more log sets of data are associated with or otherwise mapped to one or more log indices. The log indices may be existing log indices or may be log indices that are instantiated specifically for associating with the log sets of data. Each log index of the log indices represent or are otherwise associated with a partition of computer memory. For example, each log index may represent a searchable, 0.5 TB-sized (or otherwise suitably sized) partition of computer memory. The computer memory may be physically partitioned or otherwise suitably partitioned for being associated with the log index. By associating a log set of data with a log index, the log set of data may be stored in the partition before, during, and/or after processing the log set of data. In some embodiments, the partitions of computer memory may be partitioned by properties of the log sets of data. For example, each partition (or each group of partitions) may store log data having a common property.

At step 260, the one or more log indices are assigned to one or more log processing buckets. The assignment may represent a data flow such that log set of data corresponding to the one or more log indices is passed to specific log processing buckets. In some embodiments, each log processing bucket includes one or more log indices. For example, one, two, three, four, or more log indexes can be assigned to a log processing bucket. The log indexes may be assigned to the log processing bucket by processing efficiency, data type, and the like. For example, log indexes that will require a particular amount of computing resources for efficient processing may be assigned to a similar log processing bucket. In another example, log indexes having similar data types or processing types may be assigned to a similar log processing bucket. Additionally, by being assigned to a log processing bucket, the log indexes can be treated as a single entity during (or for) processing. For example, if a log processing bucket is allocated to a particular computing resource for processing, then the log indexes assigned to the log processing bucket (without individually searching for/assigning each log index) are equally allocated to the particular computing resource for processing.

At step 270, the one or more log processing buckets is allocated to one or more log processor instances. The allocation may represent a data flow such that log set data passed to a particular log processing bucket may be processed by a particular corresponding log processor instance. The particular log processor instance may include one or more computing resources such as computing chips, cloud computing resources, and the like. The log processing buckets are allocated to corresponding log processor instances based on computing time or resources associated with the log processing bucket, utilization of resources included in the log processor instances, other considerations, or any suitable combination thereof. For example, if a log processor instance is underutilized, and the amount of underutilization is greater than a utilization expected to be used by a particular log processing bucket, the particular log processing bucket can be allocated to the log processor instance. Additionally, if a log processor instance, or any resources thereof, is over-utilized, log processing buckets may not be assigned to the log processor instance until the log processor instance regains sufficient processing capacity.

In various embodiments (e.g., not pictured in FIG. 2), the one or more log processor instances are mapped to one or more sections of computer memory. The one or more sections of computer memory may be subsets of an electronic storage medium capable of storing data such as log sets of data. In various embodiments, the sections of computer memory may be one or more server clusters. The mapping to the sections of computer memory may represent a data flow such that the log processor instances are mapped to particular portions of a server for storage after processing.

In various embodiments (e.g., not pictured in FIG. 2), a particular log set of the one or more log sets is processed using a corresponding log processor instance. The processing of the particular log set may be decided directly based on the previous mappings, associations, assignments, allocations, etc. between entities descried herein. The processed log set of data may then be stored in a section or partition of computer memory corresponding to the log processor instance that processed it. This section of computer memory may be based on the mapping between the log processor instance and a section of computer memory as described above.

In various embodiments, log indices may represent a number of core processing groups, which are fixed. The number of core processing groups may be represented as instantiable log indices which represent partitioning or reservation of computing resources for processing, storing, or querying data.

In various embodiments, log index mapping may be disabled manually, automatically, or by default for a data processing system. Log index mapping may be enabled in all or a subset of data processors to extend dynamic data processing mapping to all or a subset of entities as described herein.

In various embodiments, data processing may comprise two or more separate phases of operation. An assigning phase may utilize multiple processing threads to partition one or more entities according to determined mappings. In various further embodiments, the partitions are based on tenant-focused partition procedures. A tenant data source may be assigned to one or more resources through mapping relationships. For example, a tenant may be assigned or allocated at least two "preferred" log processor instances for processing a tenant's data. One processor instance may handle data processing and another may act as a system redundancy for backup processing in the event of a failure of the primary processor instance. In various further embodiments, if a log processor instance is being underutilized, the log processor instance may accept data processing jobs from other tenants. A separate processing phase may cause loading of data to each log processor instance assigned to an associated tenant for placement in a blocking queue for processing decided during the assigning phase.

In various further embodiments, an allocation algorithm dynamically assesses and distributes workload mappings based on utilization or messages rates between systems. For example, process 200 may represent a static or otherwise initial process in which log sets of data are associated with log indexes, log indexes are assigned to log processing buckets, and log processing buckets are allocated to log processor instances. And, the allocation algorithm may execute periodically (e.g., during or subsequent to process 200), or continuously or in response to receiving input, assess the associations, the assignments, and the allocations among the log sets of data, log indexes, log processing buckets, and log processor instances to optimize efficiency of log data processing.

Exemplary Data Flows for Dynamic Lot Indexing and Processing

Figure 3:
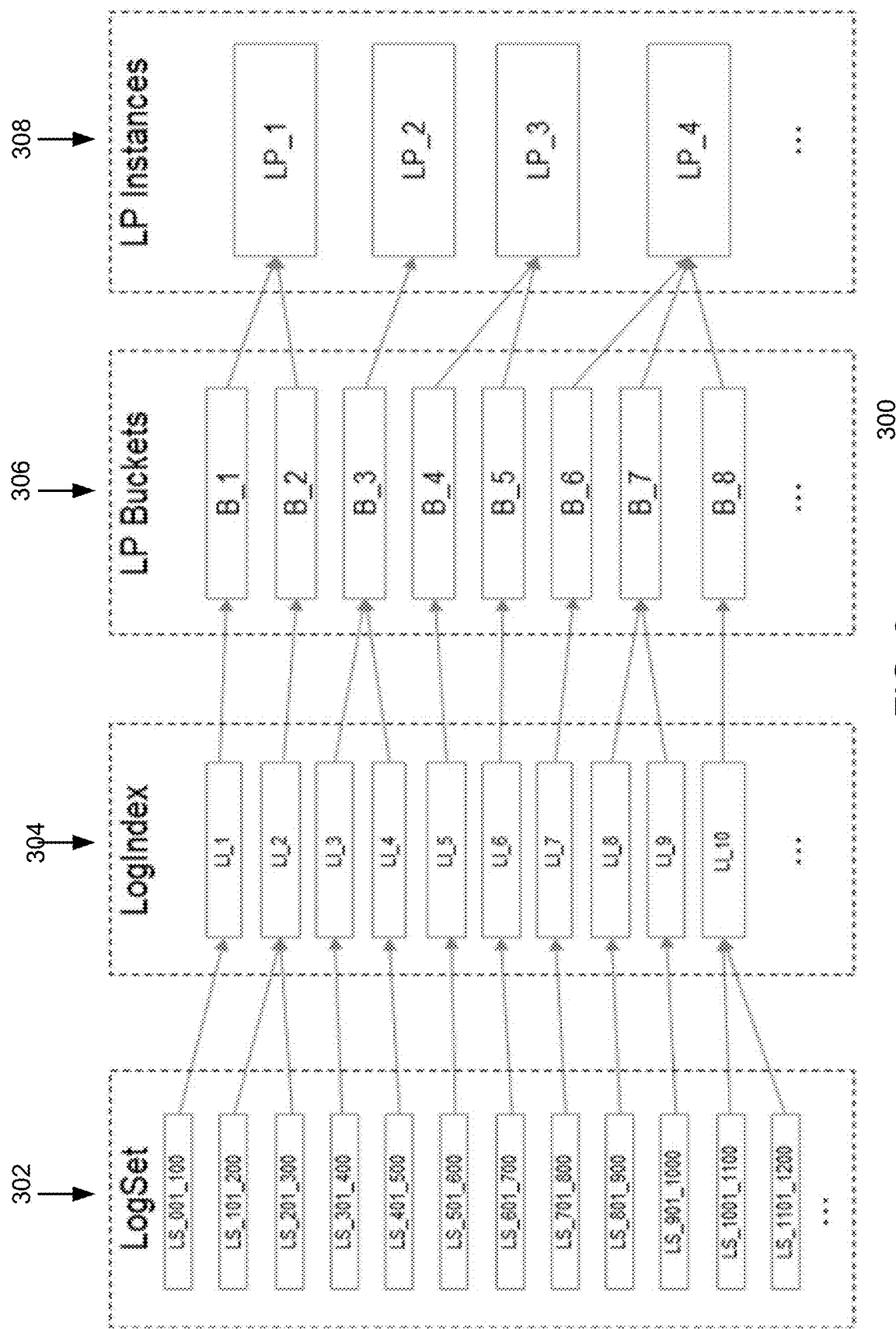
FIG. 3 is an example of associations, assignments, and allocations performable by the system described herein according to an embodiment.

FIG. 3 is an example of associations, assignments, and allocations performable by the system described herein according to an embodiment. For example, FIG. 3 illustrates an example of a flowchart 300 for mapping between various entities including log sets 302, log indices 304, log processing buckets 306, and log processor instances 308. Flowchart 300 depicts how the various entities may be mapped, associated, assigned, and/or allocated.

As illustrated, the log sets 302 include 12 individual log sets, but any other suitable amount (e.g., less than 12 or more than 12) log sets may be included in the log sets 302. In some embodiments, each log set of the log sets 302 are associated with or otherwise mapped to a log index of log indices 304. As illustrated, the log indices includes 10 log indices, but other suitable amounts (e.g., less than 10 or more than 10) of log indices are possible. Each log index of the log indices 304 may be associated with one or more log sets of the log sets 302. For example, log set LS_001_100 is associated with log index LI_1, log set LS_101_200 and log set LS_201_300 are associated with log index LI_2, etc. While each log index of the log indices 304 is illustrated as being associated with one or two log sets of the log sets 302, each log index can be associated with other amounts (e.g., zero, three, four, or more, etc.) of log sets of the log sets 302. In some embodiments, logs sets are stored in computer memory partitions that represent the corresponding log indexes.

As illustrated, log processing buckets 306 includes eight log processing buckets, but other suitable amounts (e.g., less than eight or more than eight) of log processing buckets are possible. Each log index of the log indices 304 is assigned to a log processing bucket of the log processing buckets 306. For example, log index LI_2 is assigned to log processing bucket B_2, log index LI_3 and log index LI_4 are assigned to log processing bucket B_3, etc. While each log processing bucket of the log processing buckets 306 is illustrated as being assigned one or two log indexes, each log processing bucket can be assigned other suitable amounts (e.g., zero, three, four, or more, etc.) of log indexes.

As illustrated, log processing instances 308 includes four log processing instances, but other suitable amounts (e.g., less than four or more than four) of log processing instances are possible. Each log processing bucket of the log processing buckets 306 is allocated to a log processing instance of the log processing instances 308. For example, log processing bucket B_1 and log processing bucket B_2 are allocated to log processor instance LP_1, log processing bucket B_3 is allocated to log processor instance LP_2, etc. The log processing buckets 306 can be otherwise suitably allocated to corresponding log processor instances. In some embodiments, the log processing buckets 306 can be allocated to the corresponding log processor instances statically (e.g., using received log data) or dynamically (e.g., during or subsequent to process 200 or other similar processes).

Figure 4:
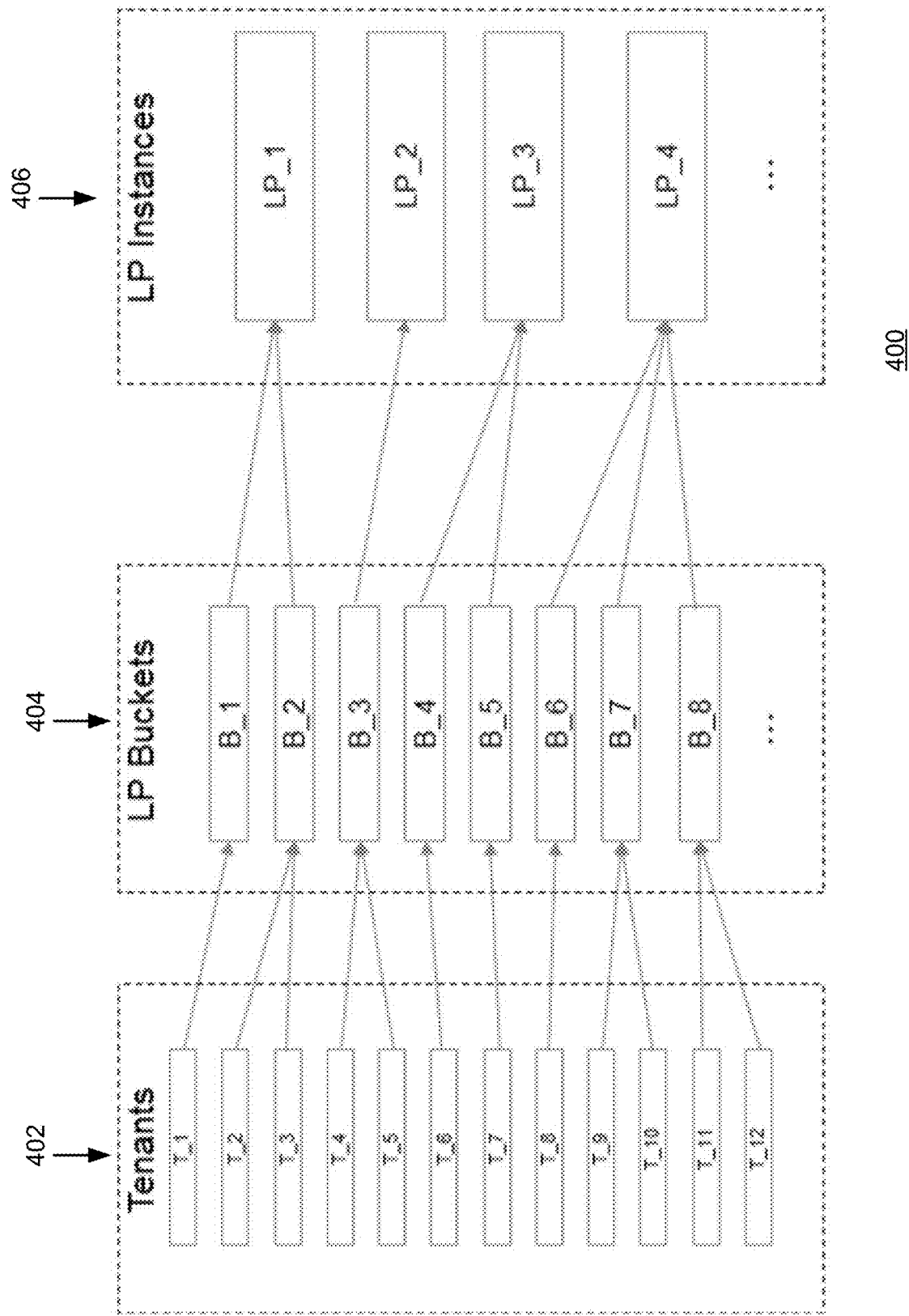
FIG. 4 is an example of tenant-based assignments and allocations performable by the system described herein according to an embodiment.

FIG. 4 is an example of tenant-based assignments and allocations performable by the system described herein according to an embodiment. For example, FIG. 4 illustrates an example of a flowchart for mapping tenants (as data sources) to log processing buckets and further to log processing instances. Flowchart 400 illustrates how the various entities may be mapped, associated, assigned, and/or allocated. For example, rather than a particular log set of data being indirectly mapped to a particular log processor instance, a tenant data source may be mapped instead (e.g., in place of the particular log set of data).

As illustrated in FIG. 4, and instead of using the log indices 304, data tenants 402 are mapped to log processing buckets 404, which are similar or identical to the log processing buckets 306 illustrated with respect to FIG. 3. For example, log data from the data tenants 402 may be directly mapped or assigned to respective log processing buckets. Accordingly, each log processing bucket of the log processing buckets 404 may be reserved for a particular tenant or a particular set of tenants. The log processing buckets 404 are allocated to respective log processing instances 406 using techniques similar or identical to the allocation of the log processing buckets 306 to the log processing instances 308.

Figure 5:
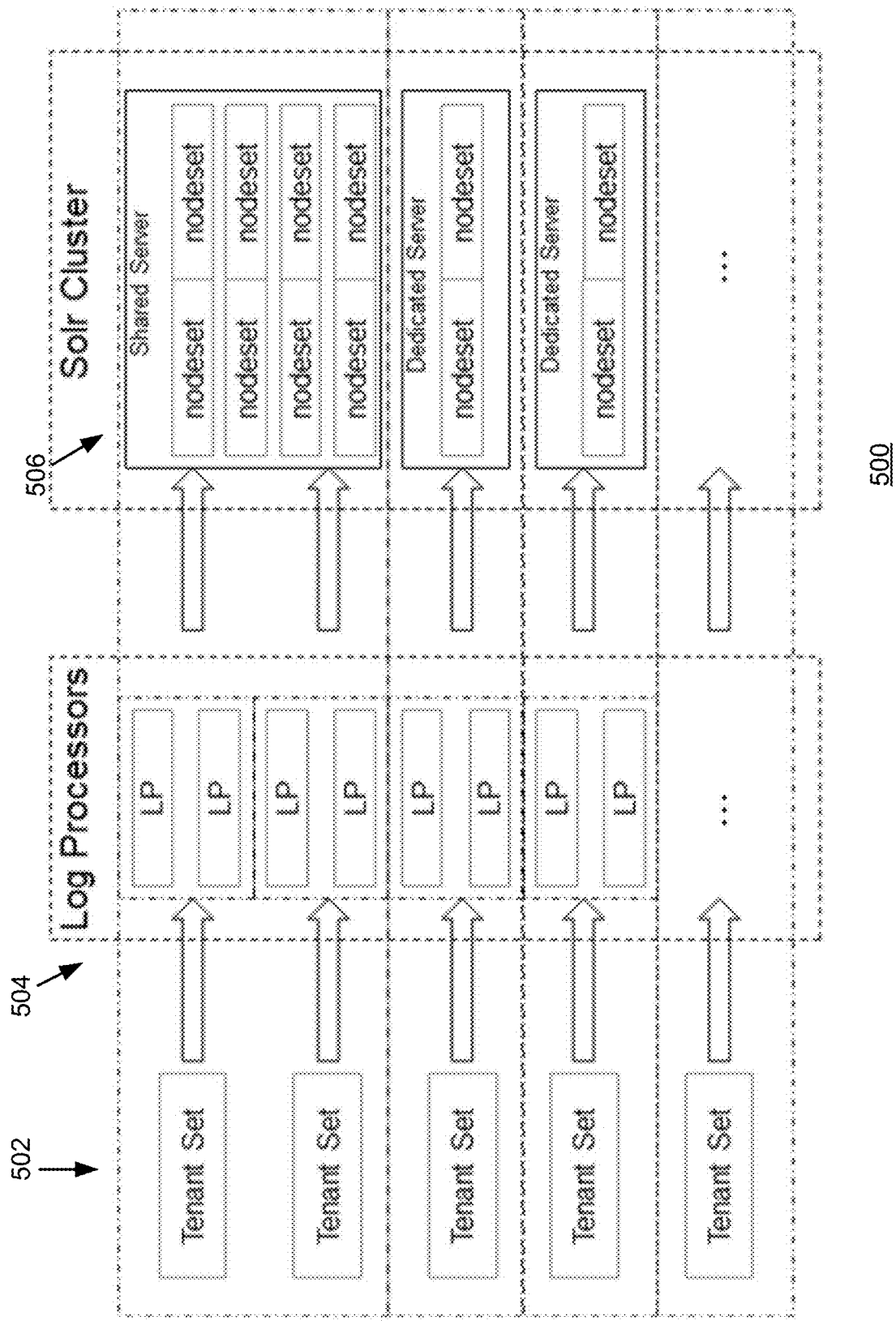
FIG. 5 is an example of tenant-based allocation and storage performable by the system described herein according to an embodiment.

FIG. 5 is an example of tenant-based allocation and storage performable by the system described herein according to an embodiment. For example, FIG. 5 illustrates an example of a flowchart for mapping between various entities including tenant sets, log processors, and server clusters. Flowchart 500 illustrates how specific resources may be partitioned in proportions to create mapped dependencies for data processing. For example, flowchart 500 shows how a number of log processors instances may be specifically mapped to tenant log sets of data and how the resulting mapping may be further mapped to server clusters and node subsets of the server cluster.

As illustrated in FIG. 5, tenant sets 502 are assigned to respective log processors 504. The tenant sets 502 can each include one or more log sets of data for processing, and the log processors 504 can each be a log processor instance (e.g., of the log processor instances 308, etc.) or any component thereof such as one or more computing resources. In some embodiments, allocating a tenant set to a log processor may be similar or identical to allocating a log processing bucket (e.g., of the log processing buckets 306) to a log processor instance (e.g., of the log processor instances 308). Log sets or other suitable data associated with the tenant set of the tenant sets 502 are processed by the respective log processor of the log processors 504. In some embodiments, the processed data from the log processor is transmitted to, or otherwise stored on, respective clusters of clusters 506. The clusters 506 may include various computer memory storage such as nodes, node clusters, servers, and the like. A respective log processor allocated a particular tenant set may be mapped to a particular cluster of the clusters 506. For example, one or more log processors may be mapped to (or otherwise associated with) a dedicated server. Accordingly, log data of the tenant sets that are processed by the one or more log processors are transmitted to or otherwise stored on the dedicated server subsequent to being processed.

Figure 6:
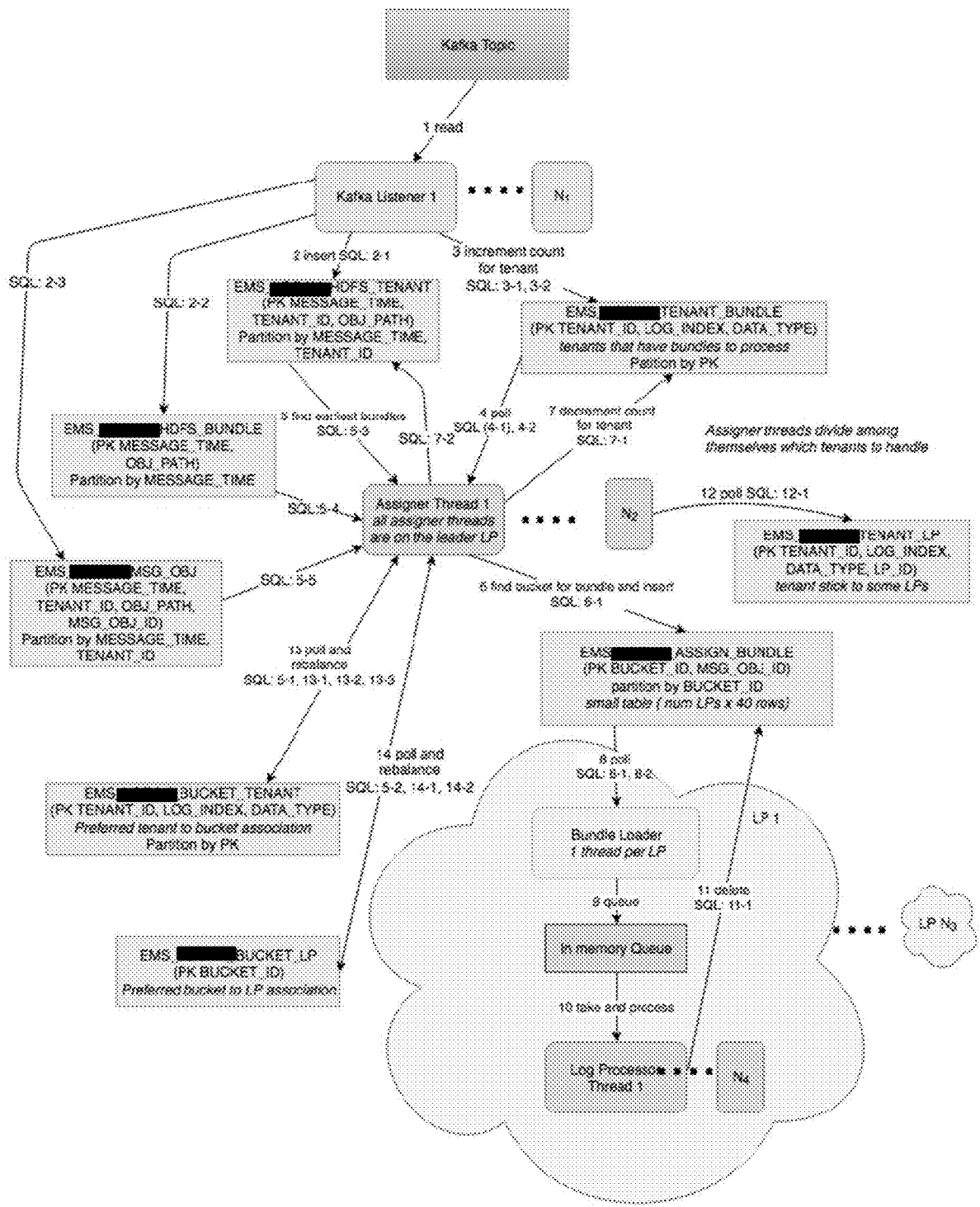
FIG. 6 is an example of a flow of log data with respect to a system for dynamically and flexibly mapping and allocating computer memory and resources according to an embodiment.

FIG. 6 is an example of a flow of log data with respect to a system for dynamically and flexibly mapping and allocating computer memory and resources according to an embodiment. Flowchart 600 depicts how threads may be assigned for processing according to Kafka-style data processing techniques.

In some embodiments, a Kafka log message consumer (i) stores HDFS bundles in EMS_LOGAN_HDFS_BUNDLE, (ii) parses Kafka JSON messages by (a) storing Gateway bundles in EMS_LOGAN_MSG_OBJ and (b) storing HDFS bundles in EMS_LOGAN_HDFS_TENANT table with corresponding tenant_id (1 to N relationship), and (iii) increments the number of unassigned bundles for the tenant in EMS_LOGAN_TENANT_BUNDLE. An assigner (e.g., a log processor assigner or other suitable entity) receives aggregate information of a number of bundles assigned to each log processing bucket and a number of assigned bundles for each tenant from a new table (EMS_LOGAN_ASSIGN_BUNDLE), busy tenants are calculated based on the aggregate info. The assigner polls information from EMS_LOGAN_BUCKET_TENANT and EMS_LOGAN_BUCKET_LP to determine if a processor LP has been assigned enough bundles. The assigner can also rebalance the log processing buckets by changing associations in EMS_LOGAN_BUCKET_TENANT table. If the number of bundles assigned to a processor LP is lower than a threshold (e.g. 40 or other suitable threshold), the assigner thread for the processor LP may query EMS_LOGAN_HDFS_TENANT to get more bundles from the non-paused and non-busy tenants that belong to the buckets associated with the processor LP, ordered by MESSAGE_TIME. The assigner assigns bundles to buckets by inserting into EMS_LOGAN_ASSIGN_BUNDLE table. Each assignment will assign a batch of limited BATCH_SIZE (e.g., 5-10). If no bundles can be found, the processor LP is flagged as HUNGRY. If more bundles than BATCH_SIZE are found, the extra bundles will be assigned to other Processor LPs with HUNGRY status. When assigned, the number of unassigned bundles per tenant will be adjusted (EMS_LOGAN_TENANT_BUNDLE).

The bundle loading thread on an LP (one per LP), polls for bundles assigned to that LP and adds them to a blocking queue. Bundle loading thread polls EMS_LOGAN_BUCKET_LP from time-to-time and rebalances the buckets if necessary. The log processor thread on the respective LP takes one bundle at a time from the blocking queue and processes. At the end of processing, the bundle can be removed from EMS_LOGAN_ASSIGN_BUNDLE. A purging service (e.g., KafkaMsgPurgingService) cleans up EMS_LOGAN_HDFS_BUNDLE, EMS_LOGAN_HDFS_TENANT, EMS_LOGAN_MSG_OBJ, as appropriate.

Figure 7:
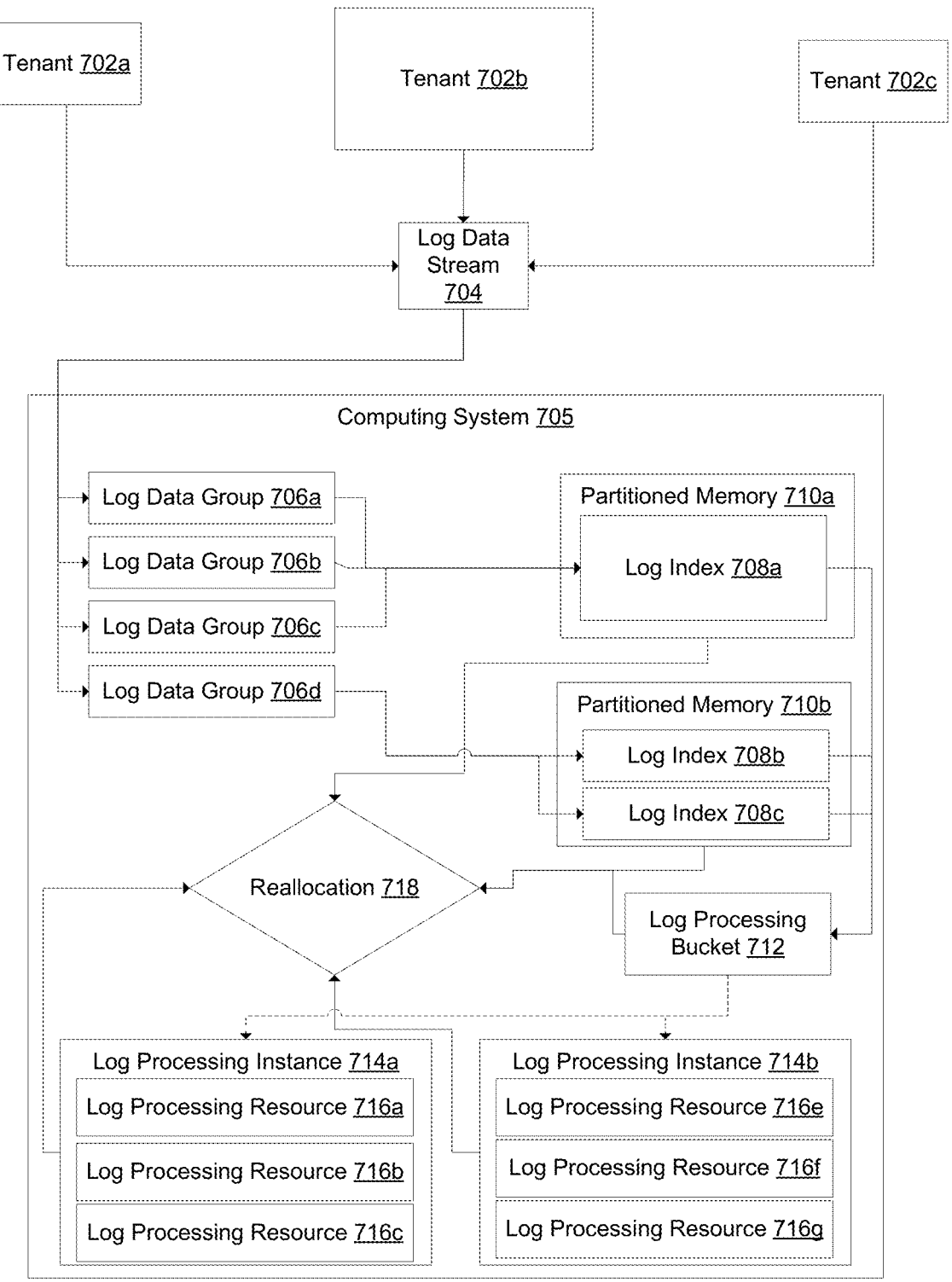
FIG. 7 is a flow diagram of log data with respect to a system for dynamically and flexibly mapping and allocating computer memory and resources according to an embodiment.

FIG. 7 is a flow diagram 700 of log data with respect to a system 705 for dynamically and flexibly mapping and allocating computer memory and resources according to an embodiment. Data tenants 702a-c may transmit various log data to the system 705 for processing, handling, storage, and for other suitable purposes. Each data tenant 702 varies in size. For example, data tenant 702a and data tenant 702c are very small data tenants, and data tenant 702b is a large data tenant 702b (sometime referred to as a super-tenant). In some embodiments, one or more of the data tenants 702a-c may pre-process or transmit metadata (e.g., size of data, type of data, pre-partitioned or pre-parsed data, etc.) relating to the log data prior to or during transmission of the log data. In other embodiments, the system 705 may pre-process the log data from one or more of the data tenants 702a-c. The log data, whether pre-processed by the data tenants 702a-c or the system 705, is transmitted to the system 705 as (or via) log data stream 704.

The log data stream 704 includes the log data from each tenant of the data tenants 702a-c, and the system 705 groups the log data included in the log data stream 704 into log data groups 706a-d, which may be similar or identical to log sets of data. As illustrated, there are four log data groups 706a-d, but other suitable amounts (e.g., less than four, greater than four) of log data groups 706 are possible. Log data from the log data stream 704 may be separated into the log data groups 706a-d based on one or more common properties of the log data. For example, the log data group 706a may include log data originating from a particular data tenant, the log data group 706b may include a particular type of log data, the log data group 706c may include log data of a particular size or processing utilization, etc.

In some embodiments, log data from the data tenants 702a-c is scanned or otherwise evaluated for determining existing mappings in the system 705. For example, an existing association may exist in the system 705 such that log data groups 706 having a common property is associated with a particular log index 708. In other embodiments, no mapping exists in the system 705. Thus, a new mapping or association is generated by the system 705 between a newly generated log data group 706 (or updated existing log data group 706) and an existing (or newly generated) log index 708.

The system 705 includes two partitions 710a-b of computer memory. In some embodiments, the system 705 includes different amounts (e.g., less than two or more than two) of partitions 710. The partitions 710a-b may be physical partitions of computer memory, virtually sectioned portions of computer memory, etc. In some embodiments, each partition 710 of computer memory includes one or more log indexes 708. For example, the partition 710a includes the log index 708a, and the partition 710b includes log index 708b and log index 708c. The partitions 710a-b can each include other suitable amounts (e.g., less than one or two or greater than one or two) of log indexes 708. In some embodiments, each log index 708 is a searchable index associated with a respective partition 710. For example, the log index 708a is a searchable object that, when searched, returns results stored on the respective partition 710.

In some embodiments, each log index 708 corresponds to a maximum processing metric such as an expected amount of computing time or resources for processing log data associated with the log index 708. The system 705 determines the total processing metric associated with the one or more log data groups 706. Additionally, the system 705 generates or reorganizes log indexes 708 based on the processing metrics associated with the log data groups 706, etc.

The system 705 associates the log data groups 706a-d with respective log indexes 708a-c. For example, the system 705 associates the log data groups 706a-c with the log index 708a, associates a first portion of the log data group 706d with the log index 708b, and associates a second portion of the log data group 706d with the log index 708c. By associating the log data groups 706a-d with the respective log indexes 708a-c, the system 705 may, at least temporarily, store, respectively, the log data groups 706a-d on the partitions 710a-b represented by the log indexes 708a-c. Accordingly, the log data groups 706a-d may be searchable in (or by) the system 705 via the log indexes 708a-c.

As illustrated in FIG. 7, the system 705 includes one log processing bucket 712, but other suitable amounts (e.g., two, three, four, or more) of log processing buckets can be included in the system 705. Upon associating the log data groups 706a-d with the log indexes 708a-c, the system 705 assigns the log indexes 708a-c to one or more log processing buckets 712, for example based on the total processing metric associated with the log indexes 708a-c. The log indexes 708a-c are assigned to the illustrated log processing bucket 712, though the log indexes 708a-c can be assigned to other suitable amounts (e.g., two, three, etc.) of log processing buckets 712 in other embodiments. In some embodiments, the log processing bucket 712 is generated and assigned the log indexes 708a-c based on an optimal processing efficiency of log data in the system 705. For example, the log indexes 708a-c may be associated with log data groups that will require 2 TB of processing resources over a 12-hour time period, and the log processing bucket 712 may be generated and processed most efficiently when 2 TB of processing is performed over the 12-hour period. In other embodiments, the log indexes 708a-c can be assigned to one or more log processing buckets based on a type of log index or log data group, a common property among the log data groups included in particular log indexes, or other considerations for assigning log indexes to log processing buckets.

The system 705 allocates the log processing bucket 712 to one or more log processor instances 714a-b. In some embodiments, more than one log processing bucket 712 can be assigned to a single log processor instance 714. As illustrated in FIG. 7, the system 705 includes two log processor instances 714a-b. The log processor instance 714a includes log processing resources 716a-c, and the log processor instance 714b includes log processing resources 716d-f. While illustrated as include three log processing resources each, the log processor instances 714a-b can each include other amounts (e.g., less than three or more than three) log processing resources 716, and the log processor instances 714a-b need not include similar amounts of log processing resources 716. Each log processing resource 716 may be or include a tangible computing resource (e.g., a chip, processor, etc.) included in the system 705 or otherwise communicatively coupled (e.g., via cloud services, and the like) to the system 705. By allocating the log processing bucket 712 to one (or more) of the log processing instances 714a-b, the system 705 causes the log data mapped to the log processing bucket 712 to be processed by one or more of the log processing resources 716a-f. For example, log data included in the log data group 706a may be mapped to the log index 708a, which may be mapped to the log processing bucket 712, which may be mapped to the log processor instance 714a. Accordingly, the log data included in the log data group 706a is indirectly mapped (e.g., without individually or directly mapping the log data) to the log processor instance 714a.

Subsequent to being processed, the log data included in the log processing bucket 712 may be stored in the partitions 710a-b or in other suitable locations such as different computer memory included in the system 705, dedicated computer memory in a server or cluster communicatively coupled to the system 705, and the like.

In some embodiments, the stages (e.g., associating log data groups 706 and log indexes 708, assigning log indexes 708 to a log processing bucket 712, allocating log processing bucket 712 to a log processing instance 714, etc.) illustrated in FIG. 7 are static such that the system 705 performs operations at each stage either initially or without concurrent processes executing. At any stage illustrated in FIG. 7, an assigner (not shown) can reevaluate the efficiency or other performance parameters of the system 705. For example, the assigner can invoke or otherwise instantiate reallocation 718, which may cause one or more updated associations, updated assignments, updated allocations, and/or updated mappings to be executed in the system 705.

The assigner can invoke reallocation 718 periodically, continuously, upon receiving external input, etc. In For example, upon receiving new or unexpected log data from the log data stream 704, the assigner may reevaluate log data group 706 and the association between the updated log data groups 706 and the log indexes 708. Accordingly, the assigner can cause the system 705 to generate a different set of log data groups 706 based on the reallocation 718. Additionally, the assignment of log indexes 708 to log processing buckets 712 and the allocation of log processing buckets to log processor instances 714 can be reevaluated by the assigner for optimizing efficiency. For example, changes to the association between the log data groups 706 and the log indexes 708 may cause inefficiencies in the existing log processing buckets 712, so the assigner can cause new log indexes 708 to be generated, new assignments to be made between the existing and/or new log indexes and the log processing buckets 712, and/or new log processing buckets 712 to be generated. Additionally, utilization of log processing resources 716 of the log processing instances 714 may change. For example, the log processing resources 716a-c may become underutilized, and an amount of underutilization may be greater than a projected utilization of a new or existing log processing bucket 712. In such case, the assigner may dynamically reallocate the new or existing log processing bucket 712 to the underutilized log processor instance 714a. Accordingly, use of the log processing resources 716 is optimized and log data (e.g., from both small and large data tenants) is processed without causing a bottlenecked resource (over-utilized) or a hungry resource (underutilized).

Illustrative Systems

Figure 8:
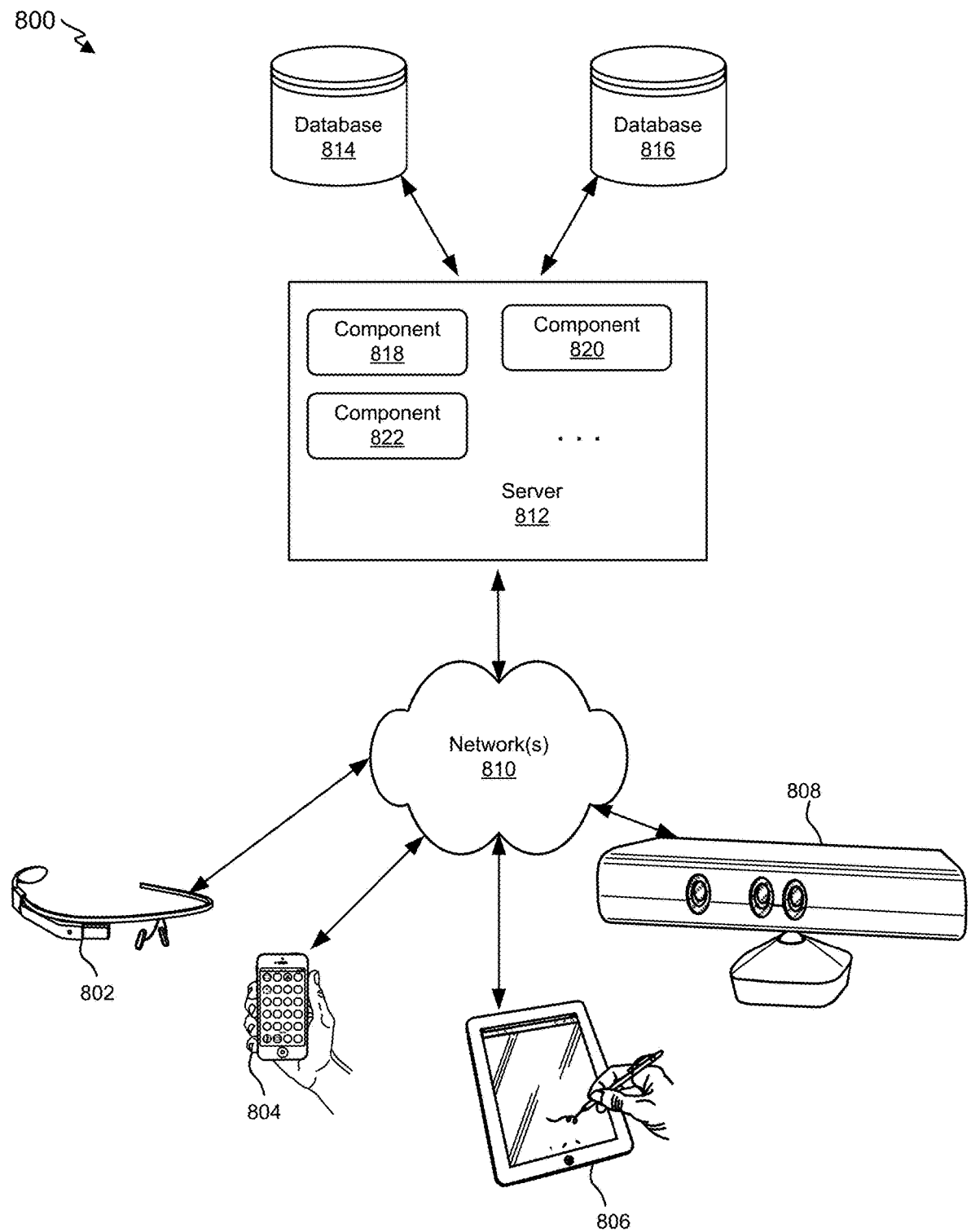
FIG. 8 is a simplified diagram illustrating a distributed system for implementing one of the embodiments.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network(s) 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of distributed system 800 are shown as being implemented on server 812. In other embodiments, one or more of the components of distributed system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
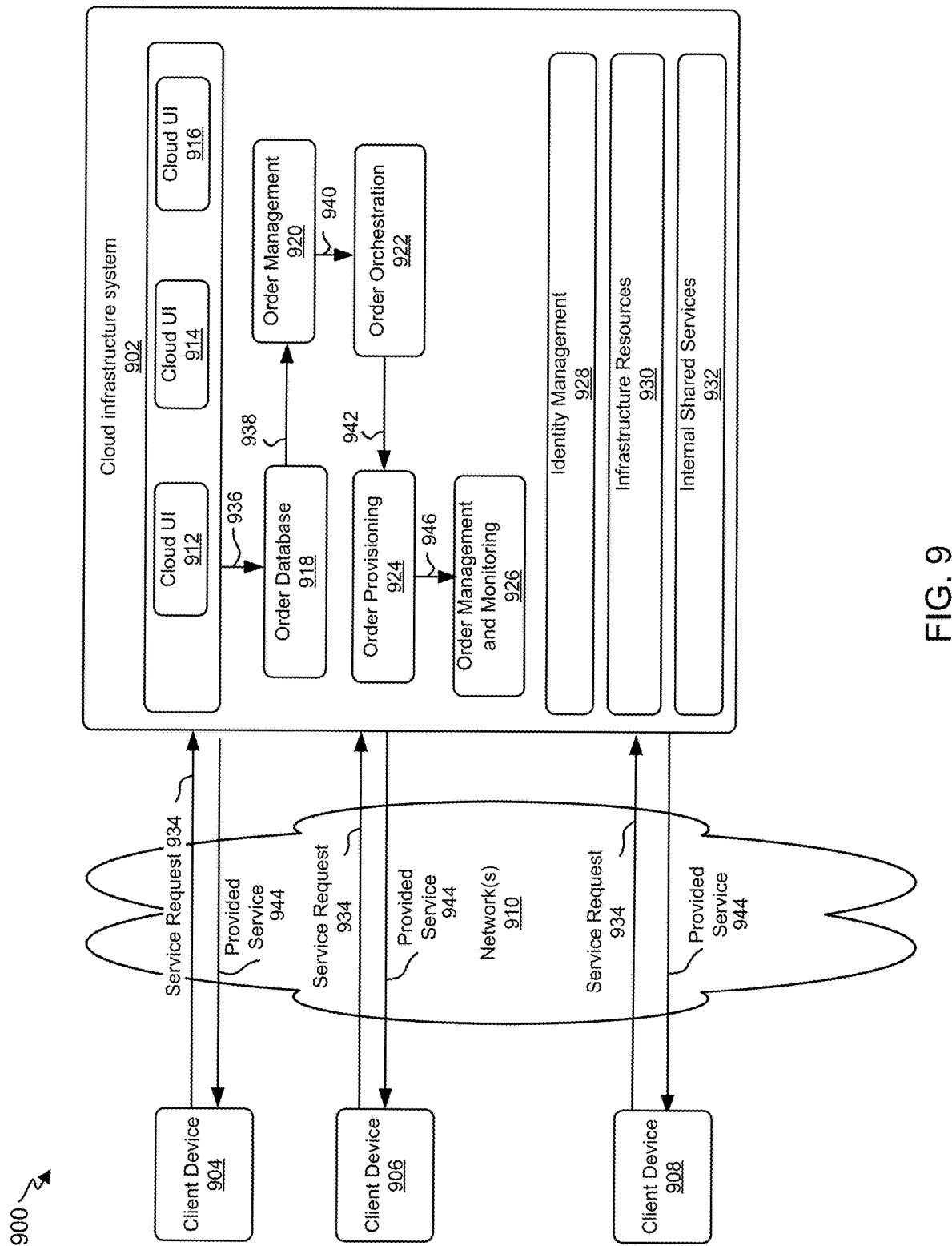
FIG. 9 is a simplified block diagram illustrating one or more components of a system environment according to an embodiment.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of processes associated with each order and applies logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
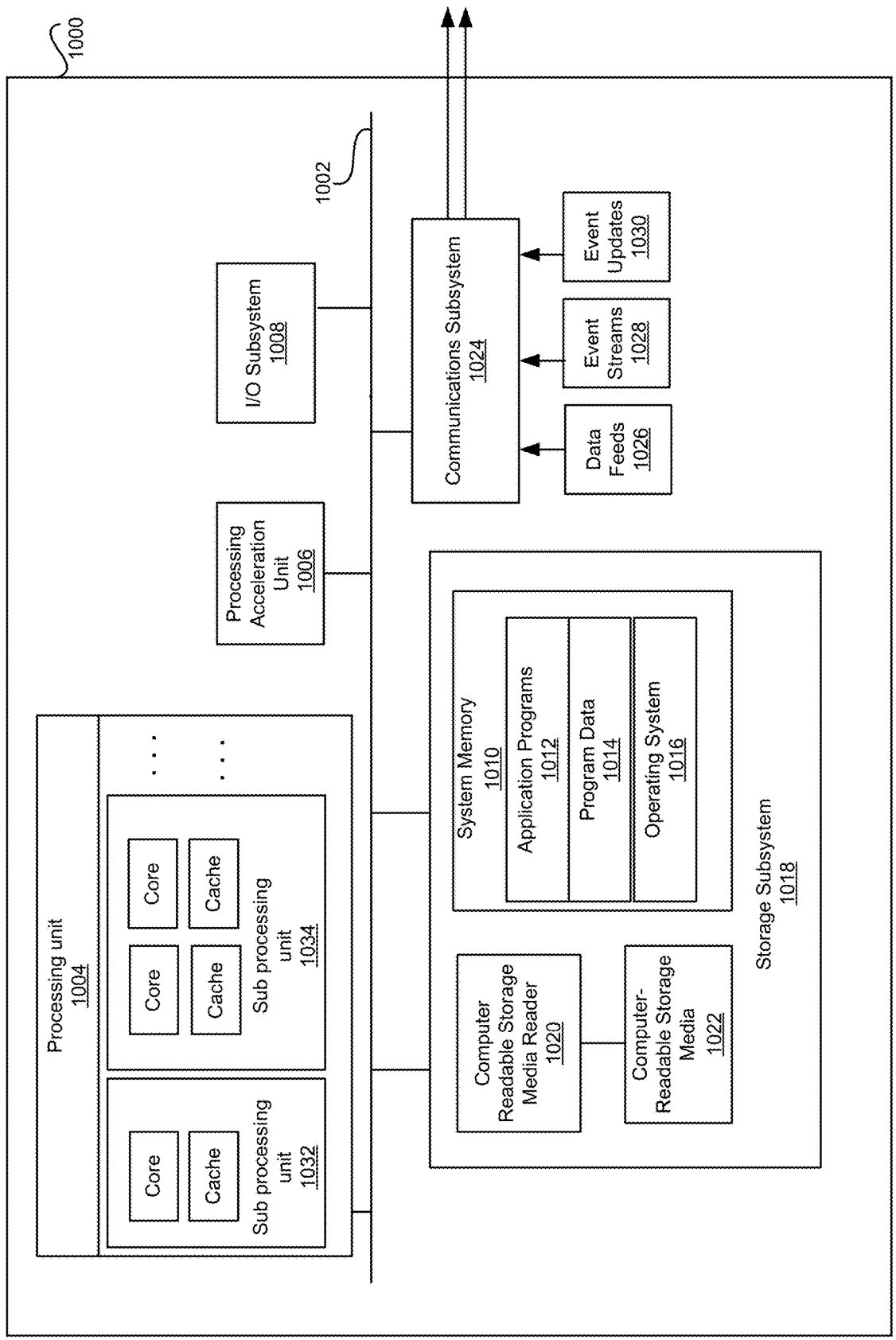
FIG. 10 illustrates an exemplary computer system, in which various embodiments of the present invention may be implemented.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
receiving a stream of log data, the stream of log data comprising one or more groups of log data, each particular group of log data of the one or more groups of log data comprising one or more log messages sharing a common property associated with the particular group of log data;
extracting, from the stream of log data, the one or more groups of log data;
generating, using the one or more groups of log data, one or more log sets of data;
associating the one or more log sets of data with a log index, which is associated with a dedicated partition of computer memory of a memory device, the dedicated partition of computer memory corresponding to the common property;
assigning the log index to a log processing bucket, the log processing bucket comprising one or more log indexes, the log index included in the one or more log indexes, the log processing bucket comprising a data domain comprising the one or more log sets of data; and
assigning the log processing bucket to a log processor instance comprising one or more processing resources for processing log data, the one or more processing resources configured to:
access the data domain through one or more processing paths to retrieve a log set of data stored in the data domain;

input the log set of data to a data processing component to receive process data as output; and store the processed data in the computer memory.

2. The computer-implemented method of claim 1, further comprising:

processing a particular log set of data of the one or more log sets of data to generate a particular processed log set of data, wherein the processing is based on a log processor instance corresponding to a log processing bucket corresponding to a log index corresponding to the particular log set of data;

mapping one or more log processor instances to one or more sections of computer memory; and storing the particular processed log set of data in a subset of the computer memory by storing the particular processed log set in a particular section of computer memory mapped to a particular log processor instance that processed the particular log set.

3. The computer-implemented method of claim 1, further comprising:

identifying, prior to extracting the one or more groups of log data, the common property associated with each group of log data of the one or more groups of log data;

determining, for each group of log data of the one or more groups of log data, whether the groups of log data corresponds to an existing mapping between the common property associated with the group of log data and at least a log index of one or more log indices; and determining that a group of log data of the one or more groups of log data does not correspond to a mapping between the common property associated with the group of log data and at least a log index of the one or more log indexes, wherein mapping the one or more log sets to one or more log indices comprises generating, based on the common property, a new mapping between the group of log data and a log index of the one or more log indices.

4. The computer-implemented method of claim 1, wherein a group of log data of the one or more groups of log data is associated with a common property of being received from a particular data tenant, and wherein the one or more groups of log data each have secondary certain common properties of belonging to a particular sub-tenant, the particular sub-tenant being a sub-tenant of the data tenant.

5. The computer-implemented method of claim 1, wherein a log index corresponds to a maximum processing metric, and wherein the method further comprises:

determining a total processing metric corresponding to a total expected resource capacity for processing or storing the one or more log sets; and generating the one or more log indexes based on the determined total processing metric and the maximum processing metric of a log index, wherein assigning the log index to the log processing bucket includes assigning the one or more log indexes to the log processing bucket based on the determined total processing metric, and wherein allocating the log processing bucket to the log processor instance includes initially allocating the log processing bucket to the log processor instance that includes available processing resources exceeding the total processing metric.

6. The computer-implemented method of claim 1, wherein:

one or more mappings between one or more groups of log data and one or more log indices are stored in a local cache; and the operations further include determining whether one or more groups of incoming data corresponds to a mapping of the one or more mappings.

7. The computer-implemented method of claim 1, further comprising:

determining that a first log processor instance corresponds to a first resource utilization value that is less than a first recommended processing value;

determining that a second log processor instance corresponds to a second resource utilization value that is equal to or larger than a second recommended processing value corresponding to the second log processor instance;

determining that a particular log processing bucket, which is assigned to the second log processor instance, corresponds to a potential resource utilization value that is less than or equal to a difference between the first recommended processing value and the first resource utilization value; and reallocating the particular log processing bucket to the first log processing instance.

8. A non-transitory machine-readable storage medium comprising a computer-program product that includes instructions configured to cause a data processing apparatus to perform operations comprising:

receiving a stream of log data, the stream of log data comprising one or more groups of log data, each particular group of log data of the one or more groups of log data comprising one or more log messages sharing a common property associated with the particular group of log data;

extracting, from the stream of log data, the one or more groups of log data;

generating, using the one or more groups of log data, one or more log sets of data;

associating the one or more log sets of data with a log index, which is a dedicated partition of computer memory of a memory device, the dedicated partition of computer memory corresponding to the common property;

assigning the log index to a log processing bucket, the log processing bucket comprising one or more log indexes, the log index included in the one or more log indexes, the log processing bucket comprising a data domain comprising the one or more log sets of data; and assigning the log processing bucket to a log processor instance comprising one or more processing resources for processing log data, the one or more processing resources configured to:

access the data domain through one or more processing paths to retrieve a log set of data stored in the data domain;

input the log set of data to a data processing component to receive processed data as output; and store the processed data in the computer memory.

9. The non-transitory machine-readable storage medium of claim 8, wherein the operations further comprise:

processing a particular log set of data of the one or more log sets of data to generate a particular processed log set of data, wherein the processing is based on a log processor instance corresponding to a log processing bucket corresponding to a log index corresponding to the particular log set of data;

mapping one or more log processor instances to one or more sections of computer memory; and storing the particular processed log set of data in a subset of the computer memory by storing the particular processed log set in a particular section of computer memory mapped to a particular log processor instance that processed the particular log set.

10. The non-transitory machine-readable storage medium of claim 8, wherein the operations further comprise:
identifying, prior to extracting the one or more groups of log data, the common property associated with each group of log data of the one or more groups of log data;
determining, for each group of log data of the one or more groups of log data, whether the groups of log data corresponds to an existing mapping between the common property associated with the group of log data and at least a log index of one or more log indices; and
determining that a group of log data of the one or more groups of log data does not correspond to a mapping between the common property associated with the group of log data and at least a log index of the one or more log indexes, wherein mapping the one or more log sets to one or more log indices comprises generating, based on the common property, a new mapping between the group of log data and a log index of the one or more log indices.

11. The non-transitory machine-readable storage medium of claim 8, wherein a group of log data of the one or more groups of log data is associated with a common property of being received from a particular data tenant, and wherein the one or more groups of log data each have secondary certain common properties of belonging to a particular sub-tenant, the particular sub-tenant being a sub-tenant of the data tenant.

12. The non-transitory machine-readable storage medium of claim 8, wherein a log index corresponds to a maximum processing metric, and wherein the operations further comprise:
determining a total processing metric corresponding to a total expected resource capacity for processing or storing the one or more log sets; and
generating the one or more log indexes based on the determined total processing metric and the maximum processing metric of a log index, wherein assigning the log index to the log processing bucket includes assigning the one or more log indexes to the log processing bucket based on the determined total processing metric, and wherein allocating the log processing bucket to the log processor instance includes initially allocating the log processing bucket to the log processor instance that includes available processing resources exceeding the total processing metric.

13. The non-transitory machine-readable storage medium of claim 8, wherein:
one or more mappings between one or more groups of log data and one or more log indices are stored in a local cache; and
the operations further include determining whether one or more groups of incoming data corresponds to a mapping of the one or more mappings.

14. The non-transitory machine-readable storage medium of claim 8, further comprising:
determining that a first log processor instance corresponds to a first resource utilization value that is less than a first recommended processing value;
determining that a second log processor instance corresponds to a second resource utilization value that is equal to or larger than a second recommended processing value corresponding to the second log processor instance;
determining that a particular log processing bucket, which is assigned to the second log processor instance, corresponds to a potential resource utilization value that is less than or equal to a difference between the first recommended processing value and the first resource utilization value; and
reallocating the particular log processing bucket to the first log processing instance.

15. A system, comprising:
one or more data processors; and
a non-transitory computer-readable storage medium containing instructions which, when executed on the one or more data processors, cause the one or more data processors to perform operations comprising:
receiving a stream of log data, the stream of log data comprising at least one or more groups of log data, each particular group of log data of the one or more groups of log data comprising one or more log messages sharing a common property associated with the particular group of log data;
extracting, from the stream of log data, the one or more groups of log data;
generating, using the one or more groups of log data, one or more log sets of data;
associating the one or more log sets of data with a log index, which is a dedicated partition of computer memory stored on a memory device, the dedicated partition of computer memory corresponding to the common property;
assigning the log index to a log processing bucket, the log processing bucket comprising one or more log indexes, the log index included in the one or more log indexes, the log processing bucket comprising a data domain comprising the one or more log sets of data; and
assigning the log processing bucket to a log processor instance comprising one or more processing resources for processing log data, the one or more processing resources configured to:
access the data domain through one or more processing paths to retrieve a log set of data stored in the data domain;
input the log set of data to a data processing component to receive process data as output; and
store the processed data in the computer memory.

16. The system of claim 15, wherein the operations further comprise:
processing a particular log set of data of the one or more log sets of data to generate a particular processed log set of data, wherein the processing is based on a log processor instance corresponding to a log processing bucket corresponding to a log index corresponding to the particular log set of data;
mapping one or more log processor instances to one or more sections of computer memory; and
storing the particular processed log set of data in a subset of the computer memory by storing the particular processed log set in a particular section of computer memory mapped to a particular log processor instance that processed the particular log set.

17. The system of claim 15, wherein the operations further comprise:
identifying, prior to extracting the one or more groups of log data, the common property associated with each group of log data of the one or more groups of log data;
determining, for each group of log data of the one or more groups of log data, whether the groups of log data corresponds to an existing mapping between the common property associated with the group of log data and at least a log index of one or more log indices; and determining that a group of log data of the one or more groups of log data does not correspond to a mapping between the common property associated with the group of log data and at least a log index of the one or more log indexes, wherein mapping the one or more log sets to one or more log indices comprises generating, based on the common property, a new mapping between the group of log data and a log index of the one or more log indices.

18. The system of claim 15, wherein a group of log data of the one or more groups of log data is associated with a common property of being received from a particular data tenant, and wherein the one or more groups of log data each have secondary certain common properties of belonging to a particular sub-tenant, the particular sub-tenant being a sub-tenant of the data tenant.

19. The system of claim 15, wherein a log index corresponds to a maximum processing metric, and wherein the operations further comprise:

determining a total processing metric corresponding to a total expected resource capacity for processing or storing the one or more log sets; and generating the one or more log indexes based on the determined total processing metric and the maximum processing metric of a log index, wherein assigning the log index to the log processing bucket includes assigning the one or more log indexes to the log processing bucket based on the determined total processing metric, and wherein allocating the log processing bucket to the log processor instance includes initially allocating the log processing bucket to the log processor instance that includes available processing resources exceeding the total processing metric.

20. The system of claim 15, further comprising:

determining that a first log processor instance corresponds to a first resource utilization value that is less than a first recommended processing value;

determining that a second log processor instance corresponds to a second resource utilization value that is equal to or larger than a second recommended processing value corresponding to the second log processor instance;

determining that a particular log processing bucket, which is assigned to the second log processor instance, corresponds to a potential resource utilization value that is less than or equal to a difference between the first recommended processing value and the first resource utilization value; and reallocating the particular log processing bucket to the first log processing instance.

\* \* \* \* \*

UNITED STATES PATENT AND TRADEMARK OFFICE
CERTIFICATE OF CORRECTION

| | | |
|---|---|---|
| PATENT NO. | : 12,079,246 B2 | Page 1 of 1 |
| APPLICATION NO. | : 17/727609 | |
| DATED | : September 3, 2024 | |
| INVENTOR(S) | : Zhu et al. | |

It is certified that error appears in the above-identified patent and that said Letters Patent is hereby corrected as shown below:

In the Specification

In Column 10, Line 35, delete "Lot" and insert -- Log --, therefor.

In Column 11, Line 61, delete "Lot" and insert -- Log --, therefor.

In Column 14, Line 50, delete "Lot" and insert -- Log --, therefor.

Signed and Sealed this
Seventh Day of January, 2025

Derrick Brent
*Acting Director of the United States Patent and Trademark Office*